United States Patent Office 3,267,043
Patented August 16, 1966

3,267,043
CHROMIA-BORIA GEL AND METHOD OF MANUFACTURE
Bernard F. Mulaskey, Point Richmond, Calif., assignor to Chevron Research Company, a corporation of Delaware
No Drawing. Filed June 6, 1963, Ser. No. 285,862
4 Claims. (Cl. 252—432)

This invention relates to a chromia-boria gel and a preferred method of manufacturing the composite.

As is well known to those skilled in the catalyst art, a gel, including both xerogels and aerogels, is produced by dehydration of a hydrogel, which is defined as a solid material containing both the solid phase of a colloidal solution and the imbibed liquid phase.

It has now been found that a gel comprised of chromia-boria is a catalyst for the dehydrogenation and isomerization of paraffins. Unexpectedly it has been found that the boria component of the gel increases the acidity, and further, the stability of a chromia-containing catalyst in that the chromia-boria composite is less apt to lose effective catalytic surface area by sintering and its glow point temperature is raised. These desirable attributes allow the chromia-boria gel catalyst to be effectively employed at temperatures much higher than, say, catalysts prepared from chromia gel alone.

A preferred process for producing such a chromia-boria gel comprises reacting a chromium compound, boric acid, and an epoxide in the presence of a solvent to obtain a hydrogel comprising compounds of boron and chromium, and dehydrating the resulting hydrogel to produce said gel. The weight ratio of boria to chromia in the gel should lie in the range of from about 0.001 to about 2.3.

In the preferred method of producing the subject gel, a mixture of at least one chromium compound, boric acid and a solvent is formed. Any chromium compound is suitable so long as it can be dissolved in the solvent. Thus, such chromium compounds as chromium nitrate, sulfate, formate, and acetate may be used, although the halides are preferred. Suitable solvents that can be employed comprise, among others, water, alcohols, acetone, methyl ethyl ketone, and mixtures thereof. Enough solvent to completely dissolve the chromium salt is all that is necessary. The particular solvent that can be employed with any particular chromium salt may be readily determined from well known solubility tables. Boric acid, in an amount to provide the desired boria-chromia weight ratio in the finished gel, is then added to the mixture. The resulting mixture is then reacted with an epoxide. Preferred epoxides are oxiranes containing from 2 to 3 carbon atoms per molecule and include ethylene oxide, propylene oxide and epichlorohydrin. The amount of epoxide reacted can be expressed in a mol ratio of the epoxide to the number of reactive groups present in the mixture. This ratio should be from about 0.5 to 7.0, or more, and preferably from about 1.0 to 5.0. The reaction of the epoxide with the aforenoted mixture, normally occurring at temperatures of from about 10° to 100° F. leads to the formation of a hydrogel containing chromium and boron. This hydrogel can then be dehydrated by conventional methods, such as by evaporation of the solvents at room temperature or above. This partially dehydrated or dried gel will still lose about 30 weight percent upon further heating. This dehydration can be accomplished, for example, by heating from about 500° to about 1000° F. under atmospheric pressure. Other dehydrating methods are known to those familiar with catalyst manufacturing techniques.

Example

Fifty-four grams of $CrCl_3 \cdot 6H_2O$ was dissolved in 300 ml. of anhydrous methyl alcohol, the latter acting as the solvent. Ten grams of $H_2BO_3$ were then added and the resulting mixture cooled by ice to a temperature of about 32° F. Seventy ml. of propylene oxide was then added to the mixture, stirred, and a hydrogel formed. The hydrogel was allowed to stand for 16 hours, and was then dehydrated by the steps comprising, oven drying at 250° F. for about 12 hours, and then further dehydrating by contacting the gel for 45 minutes at 850° F. in a partial vacuum. The essentially dehydrated gel (xerogel) was then analyzed and shown to contain 61 weight percent $Cr_2O_3$ and 39 weight percent $B_2O_3$.

Crushed samples of the above produced chromia-boria gel were then contacted with normal n-butane at 1050° F., 0.2 atmosphere of butane partial pressure, and at a space velocity of 0.9 v./v./hr. The process was operated in a sequence of steps of 10 minutes of feed contact followed by 10 minutes of catalyst regeneration by contact with an oxygen-containing gas at elevated temperatures. The results showed that 63.2 weight percent of the n-butane was converted to other products. The reaction products are shown in Table 1 below:

TABLE 1

| Product: | Weight percent |
|---|---|
| Methane | 0.17 |
| Isobutane | 0.75 |
| 1-butene | 5.40 |
| Isobutene | 3.94 |
| t-2-butene | 7.57 |
| c-2-butene | 5.04 |
| Butadiene | 1.77 |
| Coke | 11.9 |

From the above table it can be seen that the chromia-boria xerogel possesses both dehydrogenation and isomerization activity.

The effective surface area of the boria chromia gel of the present invention [measured in $m.^2/g.$ (square meters per gram)] was determined by well known nitrogen adsorption methods. For comparative purposes, a chromia gel was made in exactly the same manner as described in the example above, except that no boric acid was added to the initial mixture. The surface area of this chromia gel was also determined. The comparisons of the effective areas of these two composites are shown in Table 2.

TABLE 2
[Surface area $m.^2/g.$]

| Treatment | Boria-Chromia Gel | Chromia Gel |
|---|---|---|
| 45 minutes at 850° F. in vacuum | 251 | 237 |
| 2 hours at 1,000° F. in air | 223 | 27 |
| 2 hours at 1,200° F. in air | 177 | 0 |
| 2 hours at 1,400° F. in air | 9 | 0 |

Table 2 clearly shows that the boria-chromia gel has a higher surface area than chromia gel alone, and that it maintains a high surface area at temperatures where the surface area of chromia gel is essentially zero.

A differential thermal analysis was made of the chromia-boria gel and the latter was found to have a glow point temperature of 1328° F. The chromia gel had a glow point temperature of only 1056° F.

In the method and example described above, the only metal oxides in the cogel are chromia and boria. However, the method of the present invention is not limited to producing only such gels. In addition to chromia and boria, the finished gel can also contain other metal oxides possessing catalytic activity. For example, the method can be employed to produce silica, alumina, zirconia, titania, thoria, and other metal oxides (such as the oxides of Group VI or Group VIII metals) containing gels, or mixtures thereof, along with the chromia and boria. These can be made by including, in the initial mixture, other metal compounds. Again, these compounds should be soluble for the same reason that the chromium salts should be soluble. If silica is desired as a component of the gel, the initial mixture would therefore include a silica sol. After inclusion of the silica sol and/or other metal compounds in the mixture (along with the chromium and boron compounds), the mixture is reacted with the epoxide in the same manner as previously described. The reaction mixture will form a hydrogel which can then be dehydrated to form a gel of the desired composition.

I claim:

1. The process of producing a boria and chromia-containing gel which comprises reacting a chromium compound, boric acid and an epoxide in the presence of a solvent capable of dissolving said chromium compound, whereby a hydrogel is formed, and dehydrating said hydrogel to produce said gel.

2. The success of claim 1 wherein said epoxide is an oxirane containing from 2 to 3 carbon atoms per molecule.

3. The process of claim 1 wherein the weight ratio of boria to chromia in said gel lies in the range of from about 0.001 to about 2.3.

4. The process of claim 1 wherein the chromium compound is a chromium halide.

References Cited by the Examiner

UNITED STATES PATENTS

| | | | |
|---|---|---|---|
| 2,056,386 | 10/1936 | Cambron | 252—432 X |
| 2,363,187 | 11/1944 | Layng | 252—432 X |
| 2,807,593 | 9/1957 | Dobres | 252—467 X |
| 2,874,129 | 2/1959 | Bell | 252—461 X |
| 2,983,672 | 5/1961 | Dobres et al. | 252—432 |

OSCAR R. VERTIZ, *Primary Examiner.*

MAURICE A. BRINDISI, *Examiner.*

H. S. MILLER, R. M. DAVIDSON, A. J. GREIF,
*Assistant Examiners.*